Feb. 11, 1930.    G. GARTLING    1,746,933
WELL DRILL BIT
Filed April 24, 1924
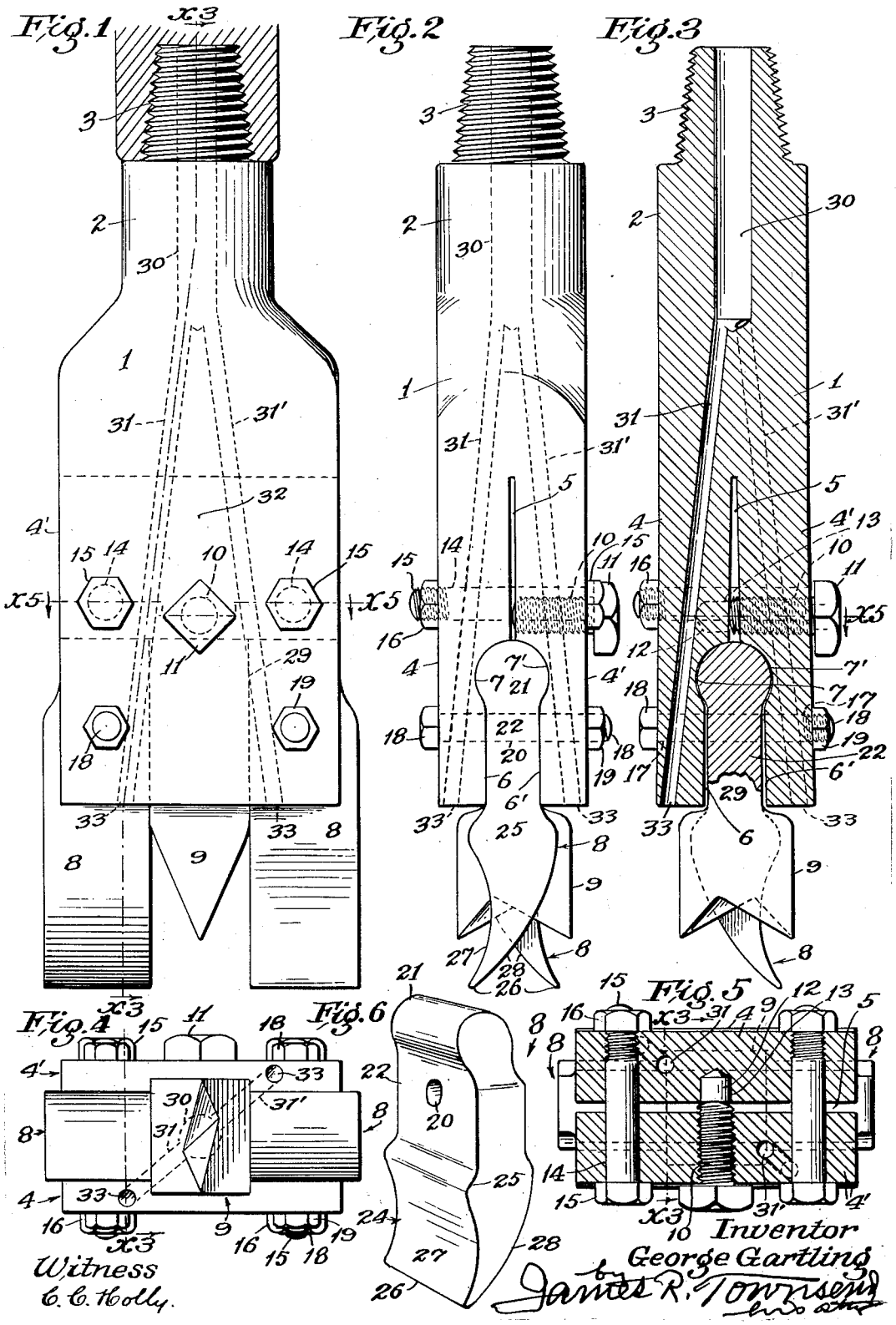

Patented Feb. 11, 1930

1,746,933

UNITED STATES PATENT OFFICE

GEORGE GARTLING, OF LOS ANGELES, CALIFORNIA

WELL-DRILL BIT

Application filed April 24, 1924. Serial No. 708,666.

Objects of this invention are to provide a superior rotary well drilling bit; to facilitate and cheapen the cost of manufacturing rotary well drilling bits; to facilitate the assembly and disassembly of the bit, and to improve the cutting qualities of the same.

Further objects are to provide a superior rotary bit cutter; and to insure against displacement of such cutters relative to each other and the body of the bit.

A feature of my invention consists in providing a bit having a split or cloven body, a shank at one end of said body, jaws at the other end thereof; cutter seats on the adjacent faces of the jaws, and means to force the jaws toward each other for the purpose of clamping a cutter between the jaws; and also in that the jaws normally clampingly fit the cutter shanks and must be spread apart to release the cutters for ready removal.

Preferably the jaws are provided with bolt holes that extend from side to side of the jaws to receive clamp bolts to force the jaws toward each other for the purpose of clamping cutters between the jaws; and one of the jaws has a threaded spreading screw hole and a spreading screw in said hole to act upon the adjacent jaw to spread the jaws to release the cutters.

Other objects, advantages and features of invention may appear from the accompanying drawing, the subjoined detail description and the appended claim.

The accompanying drawing illustrates the invention.

Figure 1 is a side elevation of a bit constructed in accordance with this invention and attached to the end of a rotary drill stock, a fragment of which is shown.

Fig. 2 is an edge elevation of the bit shown in Fig. 1.

Fig 3 is a section on lines indicated at $x^3$, Figs. 1, 4 and 5, looking in the direction of the arrow.

Fig. 4 is a view of the lower end of the bit.

Fig. 5 is a transverse section on line $x^5$, Figs. 1 and 3.

Fig. 6 is a perspective view of one of the edge cutters.

The bit comprises a body 1 having a reduced shank 2 terminating at the top in a threaded pin 3. Said body is preferably of oblong rectangular cross-section and is cloven or split longitudinally mid-way between and parallel to its sides at its lower end to form opposing jaws 4, 4' separated from each other by a slot having relatively narrow and wide portions and forming jaws having parallel flat faced walls provided with intermediate transversely extending recesses 7, 7', and adapted to seat the edge cutter 8 and the middle cutter 9.

One of the jaws as at 4' is provided with a centrally arranged threaded hole 10 from the side of the bit into the cleft 5, and is adapted to receive the spreading screw 11 which is adapted to engage the opposite jaw 4 to spread the jaws apart. Said jaw 4 is provided with a stop 12 formed of a steel pin or block inserted through the hole 10 and driven into the hole 13 provided therefor in the jaw 4; and by tightening the spreading screw, the jaws are forced apart as indicated in Fig. 3, thus to allow the insertion of the two side cutters 8 and central cutter 9. The jaws 4 and 4' are adapted to normally fit the shanks and enlargement of the cutters when the spreading screw 11 is loosened as indicated in Fig. 2; and the jaws are provided with transverse bolt holes 14 extending in line with each other from the faces to the cleft 5 and adapted to receive the clamp bolts 15, which extend from side to side of the bit body and are secured by their nuts 16. The jaws 4, 4' are also provided with bolt holes 17 which extend from each face of the bit to the cutter seats 6, 6' and are alined to receive cuter securing bolts 18 that are provided with nuts 19. The edge cutters 8 are provided with holes 20 that are alined with the holes 17, when adjusted in position against the middle cutter 9; and when the parts are in working position and the spreading screw 11 is loosened, the shanks and enlarged butts of the cutters fit snugly in the cutter seats; and when the bolts are inserted and tightened, the cutters are tightly clamped and the bolts 18 hold the cutters against lateral displacement.

The edge cutters 8 are alike and each comprises a rounded butt 21, a flat shank 22, the thickness of which is less than the diameter of the butt, and the width of which is greater than the butt; and a forwardly curved tip 24, the base 25 of which is of greater thickness than the shank 22; and which cutter terminates in an edge 26; the front and back faces 27, 28 of said tip being respectively concave and convex so that the lower part of the cutter has a forward trend at its edge 26.

The central cutter 9 is provided with a shank 29, that conforms in edge elevation to the cutters 8; and the sides of said central cutter are parallel and the flat inner edges of the shanks 22 of the edge cutters fit snugly against the flat edges of the central cutter.

The threaded pin 3 and the shank 2 are provided with an axial bore 30 and said bore communicates with divergent discharge bores 31, 31' which extend on opposite sides of the axis 32 of the bit to the outlet ports 33 at the fronts of the cutters, respectively, thus to discharge the water.

The drill receiving recesses 7 and 7' are formed by cutting out the metal in the confronting walls of slot 5 by means of an oxy-acetylene flame; heating the bit body sufficiently by suitable means, so as to allow it to be stamped into form by means of a power hammer and a swage inserted in the cleft. The hammer and swage are not shown in the drawing, it being understood that the hammer and swage employed are such as will fit the construction of bit shown in Figs. 1 and 2.

The spreading screw hole 10 is threaded and a tool is inserted through the threaded hole to bore out a socket 12 of less diameter than the threaded hole, and the hard metal stop 13 is then inserted through the threaded hole and driven home, and the spreading screw provided with a hard tip is then screwed into contact with the stop which forms a suitable seat for the rounded tip to turn on in the operation of spreading the jaws.

The spring jaws normally constitute means to tighten the cutter seat upon the cutters; and such means are supplemented by the clamp bolts when their nuts are tightened.

The cutter bolts 18, when tightened add to the clamping effect and when the spreading screw is loosened and all the bolts are tightened, the bit and its cutters are practically one and are adapted to bear great strain; and yet when it is desired to remove the cutters for sharpening or for any other purpose, this is easily done by operating the spreading screw after the bolts have been loosened.

In practical use the side cutters cut away the material at the periphery of the hole and the toothed central cutter breaks up the material at the center of the floor of the hole and delivers the borings to the water jets delivered from the bores 31 and 31'.

I claim:

The combination with a cutting tool having butt and shank portions and an opening in said shank portion; of a well drilling bit comprising a shank split longitudinally to form opposing jaws and providing alining narrow and wide slots therebetween, the confronting walls of said jaws intermediate said slots being formed with complemental transverse recesses and said recesses and wide slots providing seats for the butt and shank portions of the cutting tool; a bolt extending through one of said jaws and engaging the opposing jaw for spreading the latter outwardly to allow the tool to be inserted in said bit and a bolt extending through said jaws and tool opening to clamp the seats upon the tool.

In testimony whereof, I have hereunto set my hand at Los Angeles, California, this 17th day of April, 1924.

GEORGE GARTLING.